(No Model.)  5 Sheets—Sheet 1.
F. L. BRYANT.
MACHINE FOR MAKING COILED WIRE SPRINGS.
No. 328,380.  Patented Oct. 13, 1885.
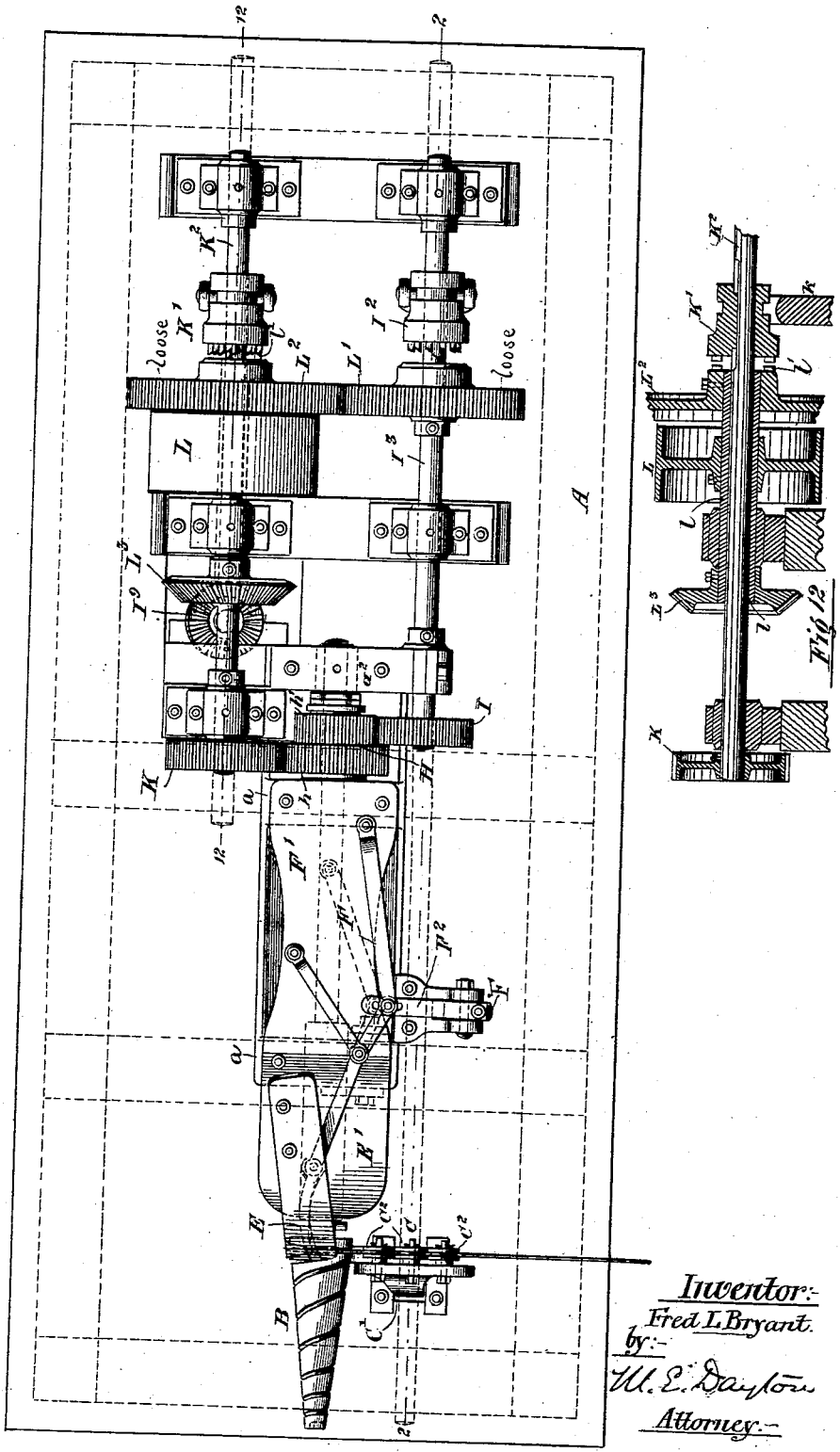

(No Model.)  
5 Sheets—Sheet 2.
F. L. BRYANT.
MACHINE FOR MAKING COILED WIRE SPRINGS.
No. 328,380. Patented Oct. 13, 1885.
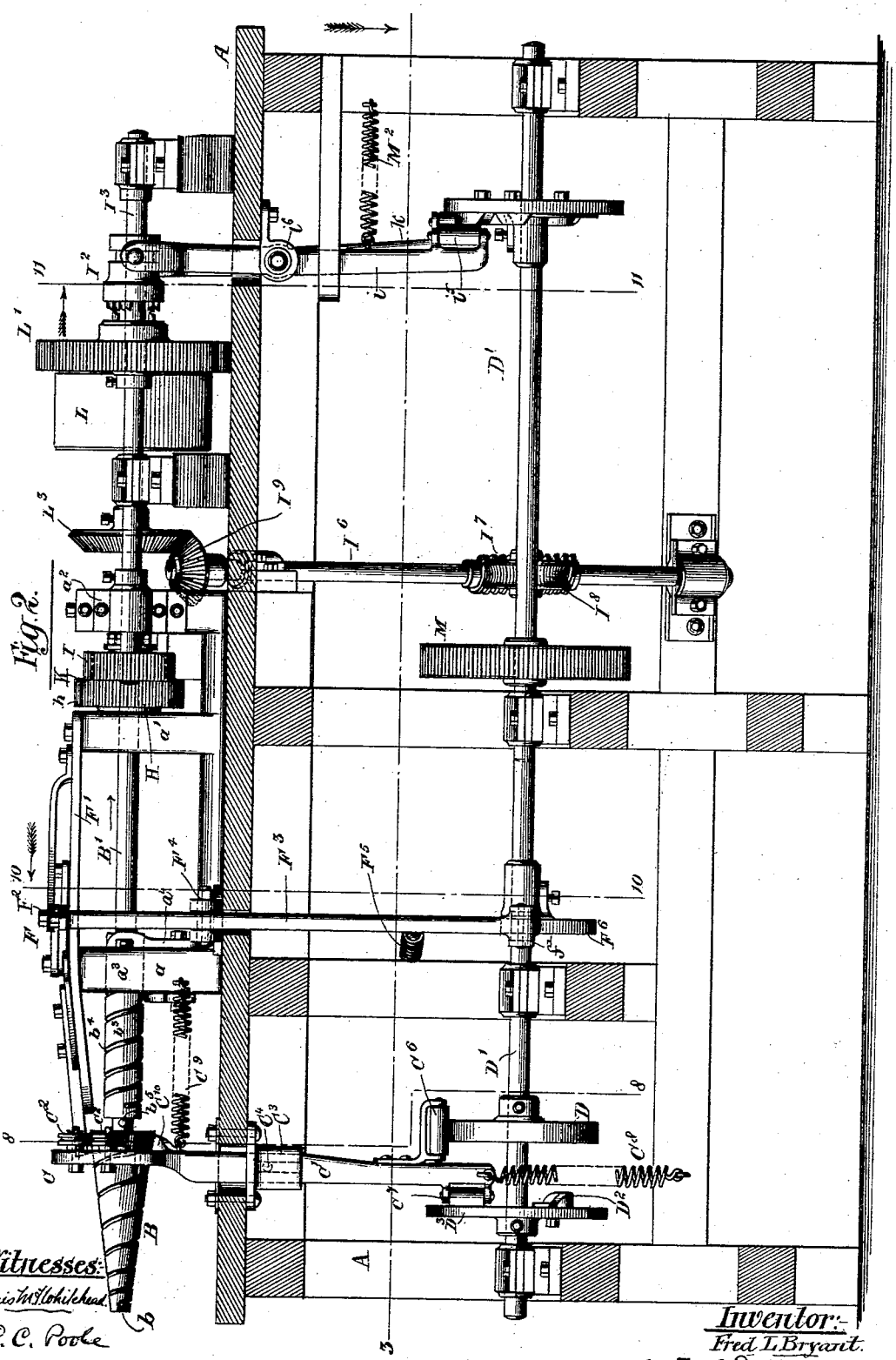
Witnesses:  
Louis W. Hotchkiss  
C. C. Poole
Inventor:—  
Fred L. Bryant.  
by J. M. E. Dayton Attorney.

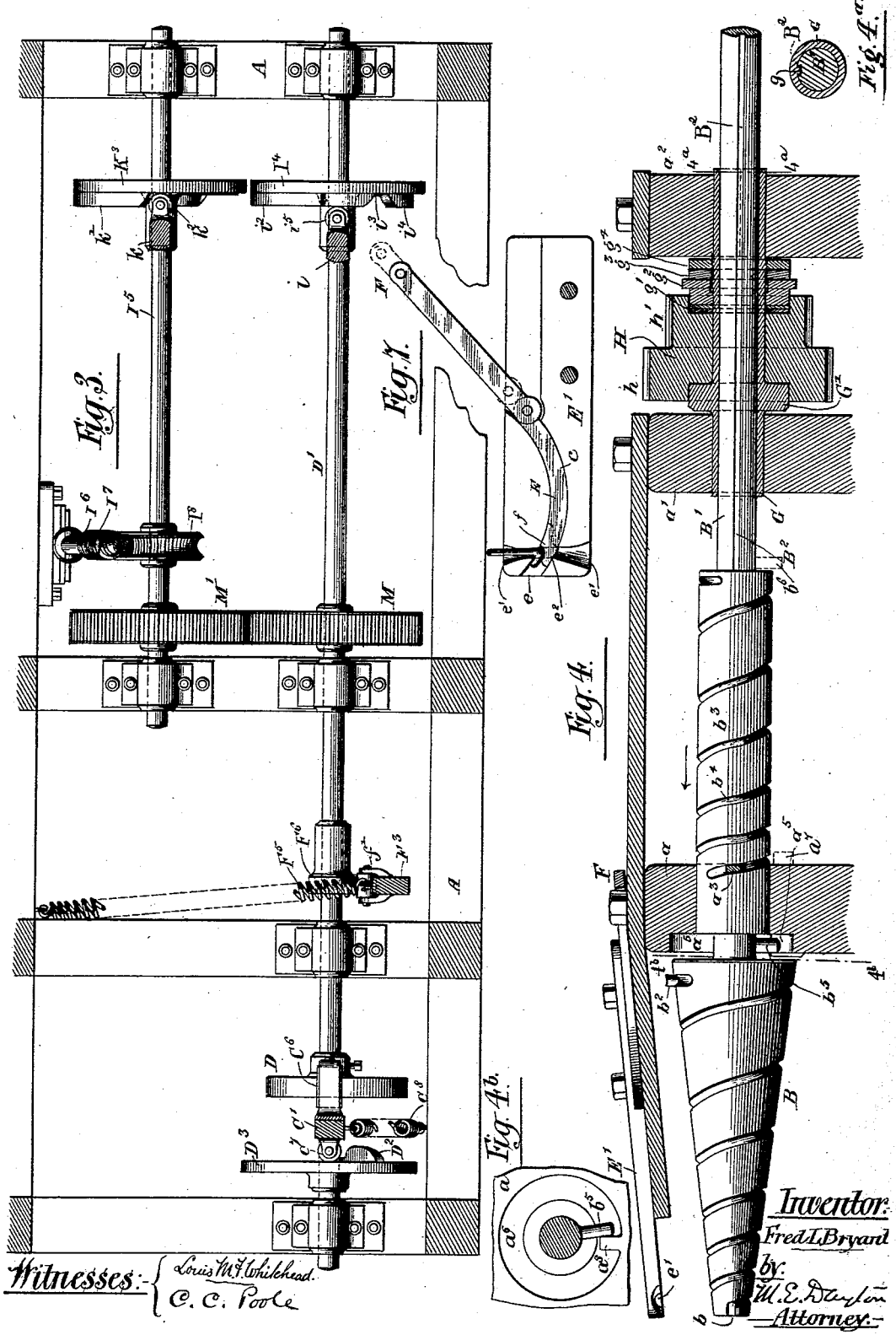

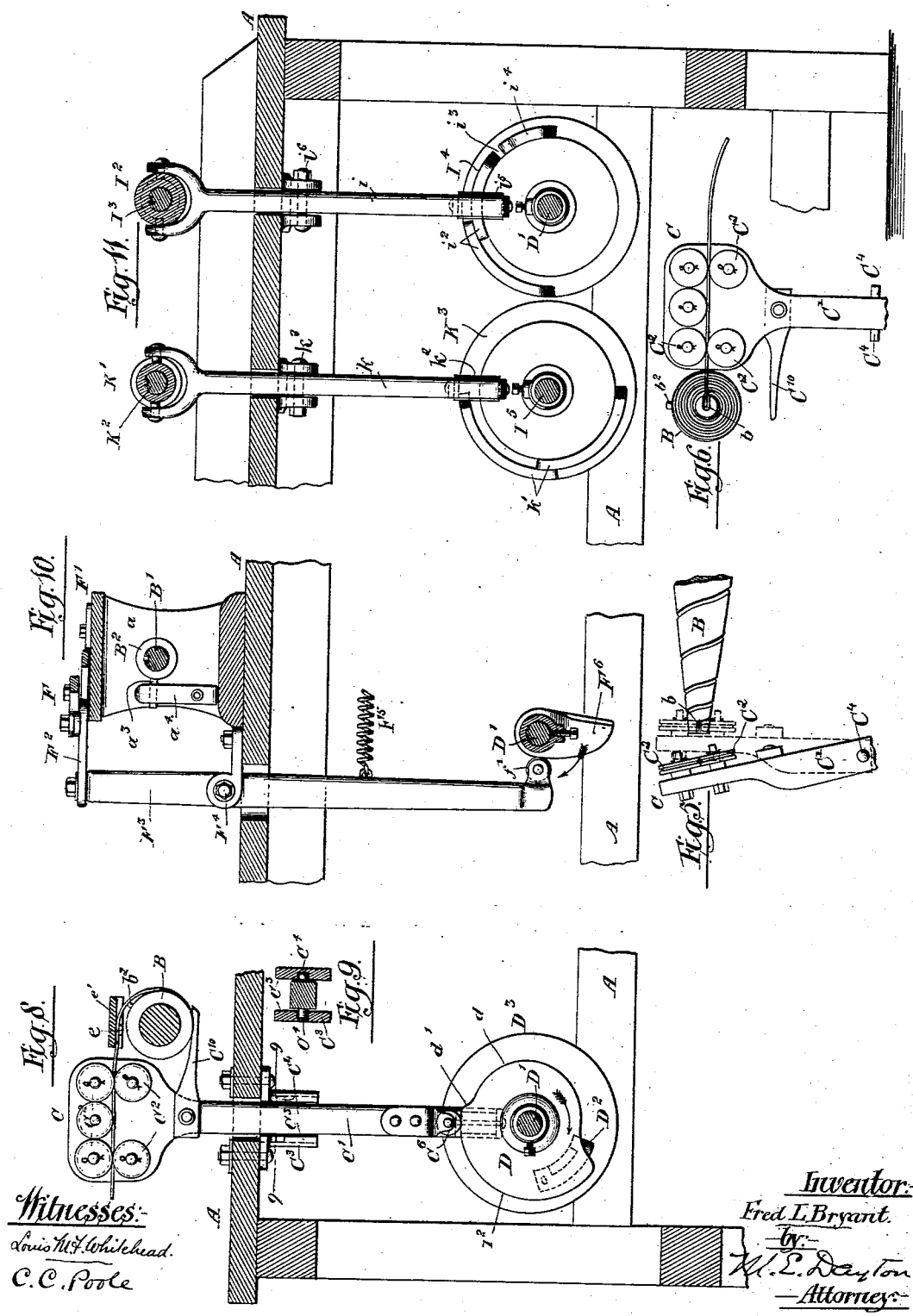

(No Model.) 5 Sheets—Sheet 5.
F. L. BRYANT.
MACHINE FOR MAKING COILED WIRE SPRINGS.
No. 328,380. Patented Oct. 13, 1885.
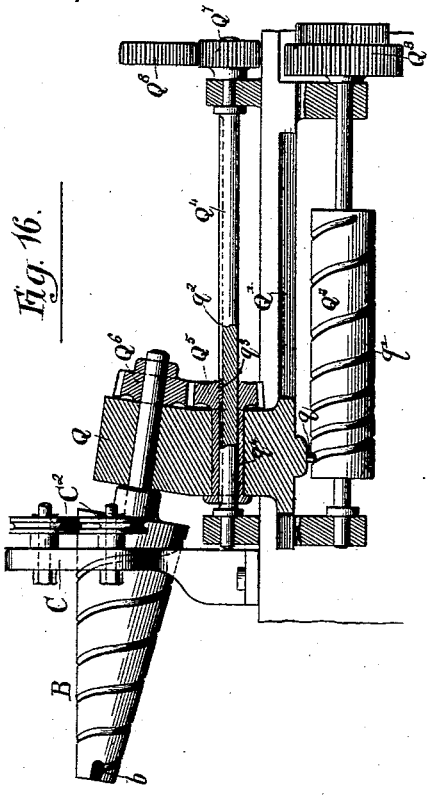
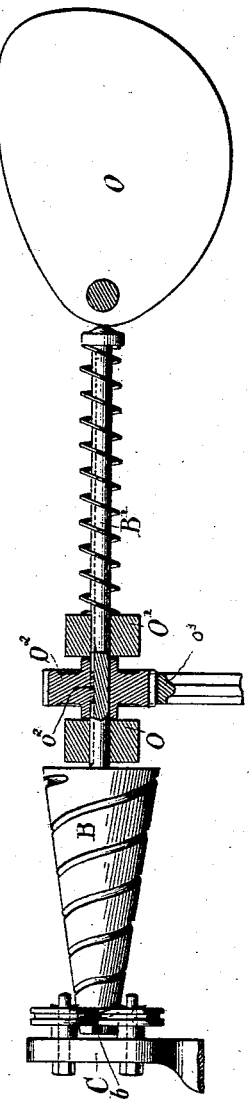
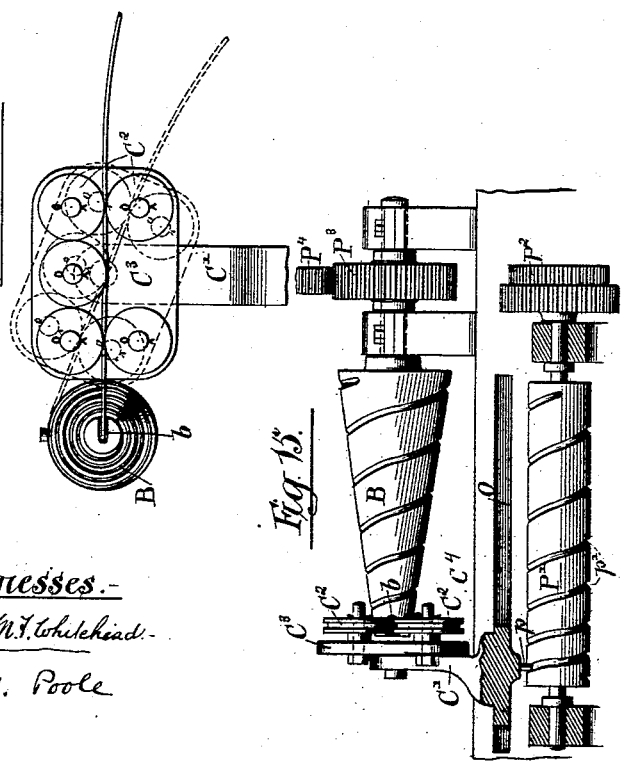
Witnesses:
Louis M. J. Whitehead.
C. C. Poole
Inventor:
Fred L. Bryant.
by:
M. E. Dayton
Attorney.

UNITED STATES PATENT OFFICE.

FRED L. BRYANT, OF CHICAGO, ILLINOIS, ASSIGNOR TO AMES & FROST, OF SAME PLACE.

MACHINE FOR MAKING COILED WIRE SPRINGS.

SPECIFICATION forming part of Letters Patent No. 328,380, dated October 13, 1885.

Application filed February 12, 1885. Serial No. 155,675. (No model.)

*To all whom it may concern:*

Be it known that I, FRED L. BRYANT, of Chicago, in the county of Cook and State of Illinois, have invented certain new and useful Improvements in Machines for Making Coiled Wire Springs; and I do hereby declare that the following is a full, clear, and exact description thereof, reference being had to the accompanying drawings, and to the letters of reference marked thereon, which form a part of this specification.

This invention relates to the manufacture of spirally-coiled conical springs, and more particularly to the production of springs of this character which are used for bed-bottoms, the principal object being to provide mechanism for automatically forming the springs, so as to save the time, labor, and expense heretofore incurred in manipulating the wire by hand during the operation of forming said springs.

The invention consists in the matters hereinafter described, and pointed out in the claims.

The prominent features of a machine embodying my invention are as follows: The said machine is provided with a rotary and longitudinally-movable conical mandrel, by preference provided with a spiral groove in its surface, to prevent the wire which is being coiled from slipping thereon. The said mandrel is desirably provided at one end with a notch or other means constructed to engage and hold the end of the wire to be wound thereon, and a wire-guide is preferably used in connection with the said mandrel, which is stationary relatively to the mandrel, and adapted to hold the wire in proper position for winding upon the mandrel, said wire-guide being by preference adapted to straighten the wire, and arranged to move in such a manner as to hold the wire at all times in alignment with or tangent to the surface of the mandrel, whereby the wire is prevented from becoming bent at the point at which it emerges from the guide, as the diameter of the mandrel increases at a point opposite the guide in the advance movement of the said mandrel.

The essential feature of construction in the machine, as far as the operation of the mandrel and wire-guide is concerned, is a relative movement of the same in the direction of the axis of rotation of the mandrel, whereby the wire is caused to wind in a spiral coil upon the mandrel during the rotary motion of the latter; and in carrying out this broad feature of the invention the said relative movement of the parts may be obtained either by the use of a rotary mandrel which is longitudinally stationary, in connection with a wire-guide movable longitudinally thereof, or by the use of a stationary guide and a longitudinally-movable mandrel. The construction last mentioned is, for several reasons, preferred, and is present in the machine herein illustrated, and hereinafter described.

The combined rotary and longitudinally-reciprocating motion of the mandrel may be accomplished by any well-known or preferred mechanisms—as, for instance, the mandrel may be intermittingly rotated by suitable gearing and advanced during the rotary movement thereof, so as to cause the winding of the wire thereon, and retracted during the intervals between the rotary movements; and such longitudinal movements of the mandrel may be accomplished by any suitable means—as, for instance, a cam acting upon a slide or carriage carrying the mandrel, or upon a longitudinally-sliding shaft or arbor supporting the mandrel, or by means of a screw-threaded rotating drum or cylinder engaged with such carriage or shaft.

In the particular form of machine, herein shown as embodying my invention, the mandrel is advanced and retracted by means of a screw-threaded drum or cylinder mounted upon a sliding shaft which carries the mandrel, said drum or cylinder being engaged by a pin upon a stationary part of the frame, whereby when the shaft is rotated in one direction a longitudinal and rotary movement of the mandrel in one direction will take place, and when the shaft is turned in the opposite direction a reverse rotary and longitudinal movement in the mandrel will occur.

The machine herein illustrated also is provided with a device for automatically cutting the finished spring from the main wire, as will hereinafter appear, said device being preferably constructed to also bend the end of the main wire at the time of cutting it, so as to form the projecting end, usually present at the apex of coiled wire-springs of the kind which the machine herein shown is intended to make.

The invention embraces also certain details of construction in machines of the character above referred to, as will hereinafter fully appear.

In the accompanying drawings, Figure 1 is a top plan view of a machine embodying the principles of my invention. Fig. 2 is a side elevation, with the main frame shown in vertical section on the line 2 2, Fig. 1. Fig. 3 is a horizontal plan section on the line 3 3 of Fig. 2. Fig. 4 is a longitudinal detail section taken through the bearings for the mandrel-stem and a double gear on the latter, the mandrel and its stem being shown in elevation. Fig. $4^a$ is a transverse section through the shaft and sleeve shown in Fig. 4, taken upon the line $4^a$ $4^a$ of said figure. Fig. $4^b$ is a transverse detail section upon line $4^b$ $4^b$ of Fig. 4, looking toward the standard $a$. Fig. 5 is a detail showing in full lines the forward end portion of the mandrel and the guide in position to bring the wire in front of the same, and in dotted lines the guide in position to direct the end of the wire in the notched end of the mandrel. Fig. 6 shows an end view of the mandrel with the wire received therein, and also illustrates the guide in position to cause the wire to pass straight through the guide and to the mandrel. Fig. 7 is a detail view showing in full lines the cutter occupying its forward position after the wire has been cut and the end of the main wire bent. This view also shows in dotted lines the cutter in position preparatory to severing the wire. Fig. 8 is a vertical section through Fig. 2 on line 8 8, looking toward the wire-guide. Fig. 9 is a transverse section through Fig. 8 on the line 9 9. Fig. 10 is a vertical section through Fig. 2 on line 10 10, looking toward the lever which operates the cutter-toggle. Fig. 11 is a vertical section through Fig. 2 on line 11 11, looking toward the cams which serve to operate the clutch-levers. Fig. 12 is a detail section through Fig. 1 on the line 12 12. Figs. 13, 14, 15, and 16 illustrate other ways of carrying out the essential features of my invention, as will be hereinafter explained.

Referring by letter to the several figures of the drawings, in which like letters denote like parts, A indicates the main frame, which is provided with bearings suitable for the several operative parts of the machine.

B refers to a spirally-grooved conical mandrel, upon which the wire is coiled to form a conical spring. The mandrel is provided at its forward smaller end with a transverse notch, $b$, in which the end of a wire passing to the mandrel from a guide, C, at one side of the same is received and held preparatory to and during the operation of spirally coiling the wire on the conical mandrel. The conical mandrel is susceptible of two main or general motions, the one being a combined rotary and longitudinally-advancing motion, for the purpose of drawing the wire through the guide and spirally winding it on the conical mandrel from the smaller to the larger end thereof, and the other being a reversal of said compound motion, for the double purpose of loosening up the wire on the mandrel to permit the conical coil to be severed at its base from the main wire and removed from the mandrel, and for retracting the mandrel to its first or back position, so as to bring its notched forward end in position to receive the end of the main wire left by the last preparatory to the operation of forming another spring.

The guide C, in the machine shown in Figs. 1 to 12, has several movements, its principal one being a movement in a direction transverse to the axis of the mandrel, so as to guide the wire tangentially to the mandrel, and to thereby prevent the wire becoming bent at the point at which it leaves the guide. This movement, in the machine shown in the said figures, takes place in a vertical direction. Another movement of the guide is an upward one, adapted to bring the wire at the end of a formed coil into position to be cut; and still another is a movement to lower the main wire, and to bring it into the notch $b$ at the forward end of the mandrel at the moment the mandrel has arrived at its back position.

The guide, as shown in the drawings, comprises a vertically reciprocating and swinging or oscillating bar, C', carrying at its upper end a set of grooved rollers, $C^2$, suitable for guiding the wire from a conveniently-located reel or spool to the mandrel, and forming means for straightening the wire preparatory to its passage to the mandrel. The said rollers are usually set slightly out of line, in such manner as to tend to bend the wire in a reverse direction to the curve taken by it, on account of its being wound upon the spool or reel. The bar C slides up and down between guide-plates $C^3$, which are secured to the top or table of the main frame at a point below a suitable opening therein, and formed of a size suitable to permit a limited swing or oscillatory motion thereof. For this purpose the bar has a sliding pivotal connection with the guide-plates $C^3$, afforded by two pivots, $C^4$, Fig. 9, provided, respectively, on each of two opposite sides of the bar, and extending into vertical grooves formed in the said guide-plates. The rising and descending movements of the guide C are derived from a cam-wheel, D, secured upon a rotary shaft, D', and the swinging or oscillatory motion of the guide is derived from a cam projection, $D^2$, on one side of a wheel, $D^3$, which is likewise secured on shaft D' at a point near the cam-wheel D.

The guide-bar C' is provided at its lower end with two rollers, $C^6$ and $C^7$, respectively arranged at opposite sides of the bar, the one, $C^6$, being arranged to rest on the periphery of the cam-wheel D, and the other, $C^7$, to normally lie against the side of the wheel $D^3$, so as to stand in the path of the cam projection $D^2$ thereon.

The cam D is formed and timed to gradually lift the guide C from the moment the mandrel begins to advance to the moment the coil is completed, to then suddenly lift the guide to the limit of its upstroke, so as to raise the main wire on a level with the point where the wire is to be cut, and to then permit the guide to descend, so that when the mandrel is at its back position the guide will be at its lowest limit, in order to bring the end of the main wire on a level with the notch in the forward end of the mandrel. This will be understood by reference to Fig. 8, in which $d$ denotes the cam-incline for gradually lifting the guide C during the advance of the mandrel; $d'$, the abrupt inclination, which serves to give the guide a sudden upward movement at the moment it has reached the elevation required for completing the base portion of the conical spring at the larger end of the conical mandrel; and $d^2$, the incline which permits the guide to descend from its highest elevation.

The cam projection $D^2$ on the wheel $D^3$ is situated about opposite the lower end of the incline $d^2$ on the cam-wheel D, so that during the latter portion of the downstroke of guide C the guide projection $D^2$ will act against the roller $C^7$ on the lower end of the guide-bar to swing the latter, and thereby throw its upper end carrying the wire in a direction parallel with the axis of the mandrel, and to an extent sufficient to bring the end of the main wire in front of the notch $b$ in the mandrel, as shown in full lines, Fig. 5, the said cam projection $D^2$ being arranged to release the guide, so as to permit the latter to swing back to its normal position, as shown in dotted lines, said figure, and thereby move the end of the wire into the notch in the forward end of the mandrel prior to the advance movement of the latter.

Suitable spring resistances are arranged to oppose the upward longitudinal and forward swinging movement of the guide—such, for example, as a spring, $C^8$, applied to the lower end of the guide-bar $C'$, and a spring, $C^9$, Fig. 2, applied to the upper portion of said bar above the pivots thereof.

The conical spring is severed from the main wire by an intermittingly-reciprocating cutter, E, (see especially Fig. 7,) which at the proper moment is advanced to cut the wire at the base of the conical coil, and also to form a right-angled bend near the new terminal of the main wire, which forms the apex of the next conical spring, so that the wire at the apex of the spring shall have the axially-arranged projecting part usually found in conical bed-springs of the character shown.

$E'$ indicates a horizontal plate which is supported in a plane above the conical mandrel, and provided in its under side with a curved way, $e$, in which the cutter E is arranged to slide. The way $e$ is intersected by a transverse groove, $e'$, which widens toward its ends and is situated in a position to receive the main wire when the mandrel is at the forward limit of its movement and the wire is raised from the mandrel to a suitable height.

The wire is raised in part by the final upward movement of the guide C, and in part by reason of the occurrence of a partial or entire preliminary backward rotation of the conical mandrel, which takes place in a direction reversely to the direction of rotation of the mandrel during its advancing movement just after the coiling of the wire on the mandrel has been completed.

By preference the mandrel is provided with a stud, $b^2$, projecting from the side and at the rear end of the mandrel in such position that at the completion of the forward movement of the mandrel the wire extending from the base end of the conical coil to the guide shall lie upon said stud, which thereby serves to lift the wire to some extent from the mandrel. The wire between this stud and the guide is further raised by the finish of the upstroke of the guide, which serves to bring the wire at or near the guide on a level with, or slightly above, the groove $e'$ in which the cut is to be made. The reception of the wire in said groove is effected by the preliminary backward turn of the mandrel, which serves to loosen the spring-coil on the mandrel, and thereby permit the wire to spring up into the groove $e'$, to be there severed by the cutter when the latter advances.

To prevent the spring-coil when thus loosened from dropping or sagging on the mandrel, the guide-bar $C'$ of the guide C is provided with an arm, $C^{10}$, which, when the guide is at the termination of its upward stroke, rests against the coil below the mandrel, whereby, when the coil is loosened, the arm will support and hold up the coil, and thereby permit the wire to enter the groove.

The wire which is received in and passes through the groove $e'$, Fig. 7, crosses the groove $e$, in which the cutter operates, and is severed at the point $e^2$, at which the edge formed by the adjacent walls of the intersecting grooves serves to form a stationary blade or knife-edge, against which the wire is forced and severed by the sliding cutter. The portion of the main wire crossing the groove $e$, and adjacent to the point at which the cut has been made, is bent by the end of the sliding cutter, which during its forward movement passes the cutting-point $e^2$ a short distance, the said cutter being at its forward end cut away, or provided with a notch at its side opposite that at which the cutting-edge is formed, as indicated at $f$, said notch being constructed to give a desired form to the bent end of the wire, as clearly shown in Fig. 7. The sliding cutter is actuated by a toggle, F, arranged to operate over a plate, $F'$, which is secured by standards $a\ a'$ on the main frame, and either made in one piece with or connected with the plate $E'$, in which the cutter-groove is formed. The said toggle may be either a single toggle of the usual form, as shown in dotted lines in Fig. 1, or a double toggle, as indicated in full lines in the said figure.

The toggle is connected by a link, $F^2$, with and intermittingly-operated from a vibratory lever, $F^3$, which is pivoted at a point between its ends upon the main frame, as at $F^4$, Fig. 10, and is at its lower end provided with a roller, $f'$, which is held by a suitably-arranged spring, $F^5$, Figs. 2, 3, and 10, in contact with the cam $F^6$, Figs. 2 and 10, secured on the rotary shaft $D'$, at the lower part of the machine.

A reversing mechanism for reciprocating and rotating the conical mandrel in such manner as to first advance and rotate the mandrel to effect the coiling of the wire thereon, to then give a partial preliminary reverse rotation to the mandrel to loosen up the spring and to then complete the retraction and rotation of the mandrel in order to bring its forward end into position for again receiving the end of the wire, is herein shown, Figs. 1 to 12, which is constructed as follows:

The conical mandrel is rigidly secured to the forward end of a rotary and longitudinally-sliding stem or shaft, $B'$, supported from or by appropriate bearings in the standards $a$, $a'$, and $a^2$. This shaft has an enlarged portion or drum, $b^3$, provided with a spiral or screw groove, $b^4$, in which a pin, $a^3$, projecting from an arm, $a^4$, on the standard $a$, is received, (see Figs. 4 and 10,) so that a rotary motion imparted to the shaft will cause it to slide longitudinally or endwise in a direction determined by the direction in which the shaft or stem of the mandrel is rotated.

The shaft is inserted through a rotary sleeve, G, provided with a spline, $g$, Fig. 4, extending into a longitudinal slot, $B^2$, in the shaft, so as to cause the shaft to rotate with the sleeve when the latter is turned, and at the same time to permit the shaft to slide freely and independently of the sleeve. The sleeve carries a double gear, H, of which the one part or gear-wheel $h$ is shown as made larger than the other part or gear-wheel $h'$, and is engaged with an intermittingly-rotating gear I, so as to rotate the mandrel-stem in a direction to effect the backward movement of the mandrel, a similar intermittingly-operating gear, K, engaging the larger gear $h$, and being arranged to rotate the shaft in a reverse direction, for effecting the advance movement of the mandrel.

The intermittent positive action of the gear K for advancing the mandrel is, as herein shown, effected by means of a clutch, $K'$, keyed to slide on and rotate with a horizontal and longitudinally-arranged upper shaft, $K^2$, upon one end of which the said driving-gear K is secured. The clutch $K'$, when thrown forward, serves to establish connection between the shaft $K^2$ and the belt-pulley L, through the medium of a sleeve, $l$, running loose on the shaft $K^2$, and carrying the belt-pulley, which is rigid on the sleeve, and one or more teeth or pins, $l'$, projecting from one end of the sleeve in position to be engaged by the clutch $K'$ when the latter is thrown forward.

The gear I is intermittingly connected with the driving-power by a similar clutch, $I^2$, operating on a horizontal rotary shaft, $I^3$, upon which the gear I is secured, and arranged to be thrown in or out of clutch with a gear, $L'$, which runs loose on the shaft $I^3$, and is engaged by a gear, $L^2$, secured on the sleeve $l$, carrying the belt-pulley.

The clutches are alternately operated, so that the clutch $K'$ is first thrown into gear with the sleeve $l$, carrying the belt-pulley, and the gears K and $L^2$, in order to cause the gear K engaging the larger gear $h$ of the double gear H to rotate the latter, and thereby effect the rotary and longitudinal advance motion of the mandrel, during which said action the gear $L'$, which is engaged by gear $L^2$, runs loose on the shaft $I^3$. After the mandrel has been thus advanced to form the coil-spring the clutch $K'$ is released from engagement with the sleeve $l$, and the clutch $I^2$ is thrown forward in clutch with gear $L'$, thereby effecting the rotation of shaft $I^3$, and consequently causing the gear I engaging the gear $h'$ to rotate the latter and thereby effect a retraction of the mandrel.

In the construction herein shown the gears $h$ and K, and also the gears $h'$ and I, are made of approximately the same size, and the spur-wheel $L'$ upon the shaft $I^3$ is smaller than the spur-wheel $L^2$, connected with the driving-pulley, whereby the shaft $I^3$ and the gear I thereon is rotated more rapidly than the shaft $K^2$, and the mandrel is thereby retracted more rapidly than it is advanced, with the advantage of producing a more rapid operation in the machine.

The clutch-lever $k$, carrying the clutch $K'$, is intermittingly actuated from a cam-wheel, $K^3$, and the clutch-lever $i$, carrying the clutch $I^2$, is intermittingly actuated from a cam-wheel, $I^4$, which said cam-wheels are located, respectively, on horizontal rotary shafts $D'$ and $I^5$, mounted in the lower part of the machine-frame. The shafts $D'$ and $I^5$ are geared together by means of gear-wheels M M', so as to rotate in reverse directions, the shaft $D'$ being driven from the shaft $I^5$, and the latter being in turn driven by an upright or inclined rotary shaft, $I^6$, provided near its lower end with a worm-gear, $I^7$, engaging a gear, $I^8$, on the shaft $I^5$, and at its upper end provided with a bevel-gear, $I^9$, engaged by a bevel-gear, $L^3$, which is secured on the sleeve $l$ carrying the belt-pulley. In this way, while the shafts carrying the cams $I^4$ and $K^3$ are continuously driven in opposite directions from a belt-pulley running loose on one of the upper driving-shafts, said upper driving-shafts, $I^3$ and $K^2$, are successively and positively driven from the belt-pulley.

The cam-wheel $K^3$, Figs. 3 and 11, has an ordinary high portion, $k'$, timed to intermittingly operate lever $k$, so as to throw and hold the clutch $K'$ in contact with the sleeve $l$ of the belt-pulley at and for a length of time suitable for effecting the advance movement of the mandrel.

The high portion $i^2$ of the cam-wheel $I^4$ is, on the contrary, provided with a depressed portion, $i^3$, situated so that after a short part, $i^4$, of the high portion $i^2$ of the cam has acted on the roller the latter shall fall back into the depression before being again acted on by the succeeding high portion of the cam. This movement of the roller effects a momentary stop in the back rotation of the mandrel, so as to permit the spring formed on the mandrel to be severed from the wire, it being seen that the short portion of the camway preceding such depressed portion thereof effects the preliminary back rotation or partial rotation of the mandrel, which, as hereinafter described, is utilized to loosen up the coiled wire on the mandrel, so as to permit the wire to spring into the cutter-groove.

The usual rollers, $i^5$ and $k^2$, at the lower ends of the clutch-levers, are held against the cam-wheels by springs $M^2$, and the said levers are pivoted to any suitable brackets or bearings, as at $i^6$ $k^3$, upon the main frame.

Inasmuch as it is essential that the notch $b$ in the forward end of the mandrel should be brought into the exact position required for receiving the bent terminal of the main wire when the mandrel has arrived at its back position, the shaft or stem of the mandrel is desirably provided at a point back of the latter with a stud or pin, $b^5$, Figs. 4 and $4^b$, which is at the moment the said notch $b$ reaches the position mentioned brought against a stop, $a^5$, conveniently situated in a recess, $a^6$, in one side of the standard $a$.

To prevent injury to the several operative parts, which might result from a greater or less continued movement of the driving mechanism after the mandrel has been thus positively stopped at the limit of its back movement, a friction-connection is preferably formed between the double gear H and the shaft $B'$ by applying the gear so that it may turn upon the sleeve G, and clamping said gear between a collar, $G'$, Fig. 4, rigid with the sleeve, and an elastic washer, $g'$, which latter is fitted on the sleeve and held against one end of the gear by a collar, $g^2$, and a nut, $g^3$, and a jam-nut, $g^4$, as shown in Fig. 4. In this way, when the shaft $B'$ is positively stopped by the contact of its pin $b^5$ with the stop $a^5$, the momentum of the driving mechanism, or other causes serving to slightly protract the rotation of the gear H, will overcome the frictional resistance of the elastic washer $g'$, and thereby cause the said gear to slip around upon the sleeve G.

The clutch devices or other mechanism used for reversing the direction of rotation of the mandrel may usually be adjusted to stop the mandrel at the limit of its advance movement with sufficient accuracy; but if found necessary or desirable a similar stop device may be used for arresting the advance rotary movement of the mandrel, as is indicated, for instance, in dotted lines at $a^7$ and $b^6$, Fig. 4.

The operation of the machine may be briefly described as follows: The end of the wire is engaged in the notch at the forward smaller end of the conical mandrel, and the latter is advanced longitudinally, and at the same time rotated, so that the wire drawn from and through the guide C will coil spirally around the conical mandrel in its spiral groove. As the mandrel thus advances in a direction past the guide C the said guide rises, so as to guide the wire from a point varying with reference to the increasing diameter of the conical mandrel at a point opposite the guide, and hence prevents the wire from bending at the guide, which latter, at the end of the forward movement of the mandrel, will be at a point to hold the wire on a level with or slightly above the cutter-groove, the wire at this moment being inclined somewhat downwardly from the guide to the larger end of the mandrel. After the completion of the forward movement of the conical mandrel it makes an entire or partial reverse rotation, during which the wire coil loosens on the mandrel, and the wire at the base end of the conical coil is permitted to spring up into the cutter-groove, and the spring-coil is severed from the main wire, and the terminal of the latter bent to form the apex of the next conical spring. The mandrel then continues its reverse rotation, and consequently returns to its back position, during which movement the guide descends. At or about the termination of the back movement of the conical mandrel, and during the last portion of the downward movement of the reciprocatory guide, the latter also performs a single oscillation, by which it first swings forward, so as to carry the bent end of the main wire in front of the forward end of the mandrel, and then, at or slightly after the termination of its downward movement, it swings back, so as to bring the bent end of the wire into the notch in the end of the mandrel. After this the operation is repeated to form another spring-coil.

The spring-coils, after being loosened on the mandrel, can be readily slipped therefrom by hand; or, if desired, any suitable arrangement of automatic stripper could be provided. For the purpose of holding and guiding the wire to the mandrel, so that said wire shall remain tangent to said mandrel while being wound thereon, it is obviously not essential that the wire-guide should be moved vertically, as above described; but the same result may be accomplished in other ways—as, for instance, the part of the guide in which the wire is held may be pivotally supported, so as to allow the wire to swing freely in a vertical plane, and thereby take the direction in which it is drawn in passing to the mandrel. This construction is illustrated in Figs. 13 and 15, in which the plate $C^3$ is shown as supporting the rollers $C^2$ of the guide, said plate being centrally pivoted to the arm C', which in this case need not be movable in a direction transverse to the axis of the mandrel.

In Fig. 14 a device is illustrated for actuating the mandrel, in which the longitudinal movement of the latter is given by means of a cam, O, acting against the end of a longitudinally-sliding shaft, B', supporting the mandrel B, a spring, O', being shown as applied to retain the shaft in contact with the cam. The said shaft may be supported in any suitable bearings, as $o$ $o'$, and is shown as being provided with a gear-wheel, $O^2$, having a spline, $o^2$, engaged with a groove, $B^2$, in the shaft B', so that said shaft will be turned by the rotary movement of said gear-wheel, and will at the same time be free to move endwise independently of the latter. Any suitably-driven spur-wheel, as $o^3$, may be engaged with the said gear-wheel for imparting motion to the latter. In this construction of the device the mandrel may be rotated intermittingly in one direction only, being in such case turned during the advance movement of the mandrel and held from rotation during the backward movement of the latter; or it may also be rotated reversely after each advance movement, so as to loosen the coil therefrom, as herein shown, and before described. The rotary movements of the shaft may be given by devices such as are herein shown, or other well-known or preferred mechanism adapted for the purpose. The guide C shown in the said Fig. 14 may be moved in the manner described in connection with the form of guide shown in Figs. 1 to 12, or otherwise, as preferred.

In Fig. 15 is shown another form of coiling device, having the same general features of construction hereinbefore set forth. In this case the rotary mandrel is shown as supported in stationary bearings, and the wire-guide is movable longitudinally thereof. As shown in said figure, $C^4$ is a slide carrying the support C' of the guide C, said slide being supported and adapted to move in suitable guides, P, arranged longitudinally of the mandrel; and P' is a cylinder or drum similar to the drum $b^3$, (shown in Fig. 4,) the said drum being provided with a spiral groove, $p'$, engaged by a pin, $p$, upon the slide $C^4$, whereby the slide and wire-guide thereon will be moved when the drum is rotated. The said drum P' is shown as provided with a double gear, $P^2$, which may be engaged by suitable gearing, similar, for instance, to that shown in Figs. 1 to 12, for rotating the drum alternately in opposite directions. The mandrel-shaft also is shown as provided with a gear-wheel, $P^3$, engaged by a spur-wheel, $P^4$, which is actuated so as to rotate the mandrel intermittingly in one direction or alternately in opposite directions, as before set forth in connection with the form of the device shown in Fig. 14. In the use of a pivoted wire-guide—such as shown in Fig. 15—the end of the wire held in the guide may be caused to engage the notch $b$ in the mandrel by a preliminary longitudinal movement of the said guide sufficient to engage the wire with the notch by a rotary movement of the drum P' before the mandrel begins its rotary movement, the mandrel being of course stopped at the termination of its previous rotary motion, with the said notch accurately in position to receive the wire.

In Fig. 16 another form of device embodying the essential principles of my invention is shown, in which the mandrel is longitudinally movable and the wire-guide is relatively stationary. In this case the mandrel B is shown as having bearings in a sliding carriage, Q, held in suitable guides, Q', the said mandrel being located with its axis at an angle with the guide-grooves, and with its upper surface horizontal or parallel with the guides Q'. By this construction it is obvious that when the mandrel is moved longitudinally all parts of the upper surface thereof will retain the same position relatively to a stationary wire-guide, C, so that a wire passing through the guide will remain constantly in alignment with the said upper surface, or, in other words, will be tangent to the mandrel at the top line of the latter while the spring is being wound. The wire-guide may in this case be moved to cause the engagement of the wire with the notch $b$ in the manner shown in Figs. 1, 2, 3, 5, 6, and 8, or otherwise, as desired. As a means of moving the mandrel longitudinally, a drum or cylinder, $Q^2$, provided with a spiral groove, $q'$, engaged by a stud, $q$, upon the carriage Q, is shown, said drum being rotated by suitable gearing acting upon the gears $Q^3$ so as to rotate the drum alternately in opposite directions, and to thereby effect the reciprocatory movement of the mandrel.

A driving-gear constructed and operated like that described in connection with the machine illustrated in the drawings, or other suitable mechanism, may obviously be used for actuating the said drum in the manner set forth.

As a means of communicating rotary motion to the mandrel, a shaft, $Q^4$, is shown in said Fig. 16 as mounted in suitable bearings with its axis parallel with the guides Q', said shaft being provided with a longitudinal groove, $q^2$, and also with a beveled pinion, $Q^5$, provided with a spline, $q^3$, engaged with the groove $q^2$ of the shaft, the said pinion being connected with the carriage Q so as to move with the latter, and engaged with a beveled pinion, $Q^6$, upon the shaft of the mandrel. The pinion $Q^5$ is, as shown, attached to the end of a sleeve, $q^4$, surrounding the shaft $Q^4$, and mounted on the carriage Q. The shaft $Q^4$ is shown also as provided at one end with a pinion, $Q^7$, engaged by a spur-wheel, $Q^8$, which may be either driven intermittingly in one direction, so as to rotate the mandrel while it is advancing only, or turned alternately in opposite directions by devices similar to those shown in the machine herein illustrated, or other mechanism suitable for the purpose, in order that the finished coil may be released by a reverse movement of the mandrel, as above set forth.

Other means than the particular mechanism above described, and illustrated in the accompanying drawings, may obviously be used in carrying out the general features of my invention, and the latter is not therefore limited in its scope to the particular devices herein shown, except as set forth in the appended specific claims; but said invention embraces all devices constructed and operating upon the same general principles that are embodied in the devices herein described and shown.

I claim as my invention—

1. A machine for making conical wire springs, comprising a rotating and longitudinally-reciprocating conical mandrel, and a wire-guide constructed to sustain the wire as it approaches the mandrel, whereby, when the mandrel is actuated, the wire will be wound upon the surface thereof, substantially as described.

2. A machine for making conical wire springs, comprising a wire-guide, and a rotary and longitudinally-reciprocatory conical mandrel provided with devices for engaging and holding the end of the wire to be wound upon said mandrel, substantially as described.

3. A machine for making wire springs, comprising a rotating and longitudinally-reciprocating conical mandrel provided with a spiral groove, substantially as described.

4. The combination, with a rotating and longitudinally-reciprocating conical mandrel, of a movable wire-guide constructed to engage the part of the wire approaching the mandrel, and to sustain the said wire in a line tangent to the surface of the mandrel, substantially as and for the purpose set forth.

5. The combination, with the rotating and longitudinally-reciprocating conical mandrel provided at one end with a notch to engage the end of the wire, of a wire-guide having a reciprocatory movement, whereby the end of the wire held in said guide may be brought into engagement with the notch in the mandrel, substantially as described.

6. The combination, with the rotary and longitudinally-reciprocatory conical mandrel, and means for actuating said mandrel, of a wire-guide movable in a direction transverse to the axis of the mandrel, and automatic actuating mechanism for the said wire-guide, substantially as and for the purpose set forth.

7. The combination, with a rotating and longitudinally-reciprocating conical mandrel, provided with a notch at one end to engage the end of the wire, of a wire-guide having a movement in a direction transverse to the axis of the mandrel, and also a longitudinally-reciprocating movement with reference to the said axis, whereby the wire may be held in a position tangent to the surface of the mandrel as the latter is advanced, and the end of the wire brought into engagement with the notch of the mandrel, substantially as described.

8. The combination, with a wire-guide, of a longitudinally-reciprocating conical mandrel having a rotating motion alternately in opposite directions, whereby a wire coiled thereon in the rotation of the mandrel in one direction may be loosened by the rotation of the mandrel in a reverse direction, substantially as described.

9. In a machine for making wire springs, the combination, with a rotating and longitudinally-reciprocating conical mandrel, of a movable cutter located in position to sever the finished springs from the main wire, and automatic means for actuating said cutter upon the completion of each spring, substantially as described.

10. The combination, with a rotary and longitudinally-reciprocatory conical mandrel for forming a conical coiled wire spring, of a movable cutter to sever the finished spring from the main wire, and a movable wire-guide constructed to carry the wire into position for the operation of the cutter, substantially as described.

11. The combination, with a rotary and longitudinally-reciprocatory conical mandrel having a rotary motion alternately in opposite directions, of a cutter to sever the finished spring from the main wire, and an arm or projection located in position to uphold the spring after it has been loosened from the conical mandrel by the backward rotation of the latter, substantially as described.

12. The combination, with the rotary and longitudinally-reciprocatory conical mandrel provided at its smaller end with a notch adapted to receive the end of the wire to be coiled, of a stop device constructed to positively check the movement of the mandrel when the said notch is in position to engage the end of the said wire, substantially as and for the purpose set forth.

13. The combination of the rotary and longitudinally-reciprocatory conical mandrel C, having a stem, B', provided with a spirally-grooved portion, $b^3$, driving mechanism connected with the stem, a fixed stud engaging the spiral groove thereof, and means for reversing said driving mechanism, substantially as described.

14. The combination, with the rotary and longitudinally-reciprocatory conical mandrel, of a movable cutter, E, and an opposing stationary cutting-edge constructed and operating to sever the finished spring from the main wire, substantially as and for the purpose set forth.

15. In a machine for making coiled wire springs, a cutting device for severing the finished springs from the main wire, comprising a plate, E', provided with a notch, $e'$, and a passage or way, $e$, intersecting said notch, and a reciprocatory cutter, E, fitted to slide in said way $e$, substantially as and for the purpose set forth.

16. In a machine for making coiled wire springs, a cutting device for severing the finished springs from the main wire, comprising a plate, E', provided with a notch, $e'$, and a way, $e$, intersecting said notch, and a reciprocating cutter, E, provided with a notch, $f$, in its end, substantially as and for the purpose set forth.

17. In a machine for making coiled wire springs, a device for severing the finished springs from the main wire, comprising a plate, E', provided with a notch, $e'$, and a groove or way, $e$, intersecting said notch, a movable cutter, E, fitted to slide in said way, and a toggle connected with the said cutter for actuating the latter, and means for actuating said toggle, substantially as described.

18. In a machine for making coiled wire springs, a device for severing the finished springs from the main wire, comprising a plate, E', provided with a notch, $e'$, and a groove or way, $e$, intersecting said notch, a cutter, E, fitted to slide in said way, a toggle connected with said cutter for actuating the latter, a lever pivoted to the machine-frame and connected with the said toggle, and a cam or equivalent means for actuating said lever, substantially as and for the purpose set forth.

19. The combination, with a rotary and longitudinally-reciprocating mandrel, of a wire-guide, C, a vertically-movable and oscillatory arm, C', supporting said guide, and cams or equivalent means for actuating said arm C', substantially as and for the purpose set forth.

20. The combination, with a rotary and longitudinally-reciprocating mandrel, of a wire-guide, C, a vertically-movable and oscillatory arm, C', supporting said guide, provided with pins $C^4$, guides $C^3$ for said pins, and cams or equivalent means for actuating said arm C', substantially as described.

21. The combination, with the guide C, and the vertically-movable and oscillatory arm C' supporting said guide, of a cam, D, acting upon said arm for moving the latter vertically, and a cam projection, $D^2$, for giving an oscillatory movement to said arm, substantially as described.

22. The combination, with a rotary and longitudinally-movable mandrel and a vertically-movable wire-guide, C, of an arm, $C^{10}$, connected and moving with said guide, substantially as and for the purpose set forth.

23. In a machine for making coiled wire springs, a longitudinally-movable mandrel provided with a pin, $b^2$, substantially as and for the purpose set forth.

24. The combination, with a rotary and longitudinally-movable mandrel provided with a notch for engaging a wire, a shaft supporting said mandrel, and means applied to the shaft for rotating and longitudinally moving said shaft, of stops $a^5$ and $b^5$ upon the machine-frame and mandrel, substantially as and for the purpose set forth.

25. The combination, with a rotary and longitudinally-movable mandrel, and a shaft supporting said mandrel mounted to slide longitudinally in suitable bearings and provided with a longitudinal groove, of a gear-wheel mounted concentrically with the shaft and having a spline engaged with the groove of the latter, means for holding the said gear-wheel from end movement with the shaft, suitable driving-connections for actuating said gear-wheel, and a rotary and spirally-grooved cylinder or equivalent means applied to move the mandrel longitudinally, substantially as described.

26. The combination, with a rotary and longitudinally-movable mandrel, and a shaft supporting said mandrel mounted to slide longitudinally in bearings and provided with a longitudinal groove, of a gear-wheel mounted concentrically with the shaft and provided with an inner part or sleeve, as G, having frictional engagement with the gear-wheel, and provided with a spline engaged with the groove of the shaft, and a spirally-grooved drum or equivalent means applied to move the mandrel longitudinally, substantially as and for the purpose set forth.

27. The combination, with the machine-frame, of the mandrel B, the shaft B', attached to and supporting said mandrel and provided with a spirally-grooved drum, $b^3$, a part or support, $a$, upon the frame affording bearings for the said drum $b^3$, provided with a stud, $a^3$, engaged with the groove of the cylinder, supports, as $a'$ $a^2$, upon the machine-frame affording bearings for the shaft B', and suitable driving-connections for rotating the said shaft, substantially as described.

28. The combination, with the machine-frame, the rotary and longitudinally-movable mandrel B, and a spirally-grooved drum or equivalent means applied to move the mandrel longitudinally, of a shaft, B', supporting said mandrel, provided with a longitudinal groove, supports, as $a'$ and $a^2$, for said shaft, a sleeve, G, surrounding the shaft, having bearings in said supports $a'$ $a^2$, and provided with a spline engaged with the groove of the shaft and with a collar, G', a gear-wheel, H, mounted upon the said sleeve in contact with the collar G', and a nut, $g^2$, or equivalent means, for causing frictional engagement between the gear and sleeve, substantially as and for the purpose set forth.

29. The combination, with the rotary and longitudinally-movable mandrel, and a shaft supporting said mandrel, of the double gear H upon said shaft, shafts $I^3$ and $K^2$, provided with gear-wheels I and K, engaged with the said gear H, a gear, $L^2$, mounted concentrically with the shaft $K^2$, a driving-pulley, L, connected with said gear $L^2$, a gear, L', intermeshing with the gear $L^2$ and mounted concentrically with the shaft $I^3$, and suitable clutch devices for alternately connecting the said wheels L² and L' with the shafts K² and I³, substantially as described.

30. The combination, with the rotary and longitudinally-movable mandrel, and a cutter, E, for severing the finished spring from the main wire, of driving-connections for rotating the mandrel, comprising two oppositely-rotating shafts, driving-wheels mounted concentrically with said shafts, clutches for connecting the driving-wheels with the shafts, and cams K³ and I⁴ for actuating said clutches, the cam I⁴ being provided with a depressed portion, $i^3$, whereby the mandrel is momentarily stopped in its backward rotation, substantially as and for the purpose set forth.

In testimony that I claim the foregoing as my invention I affix my signature in presence of two witnesses.

FRED L. BRYANT.

Witnesses:
C. CLARENCE POOLE,
OLIVER E. PAGIN.